(12) United States Patent
Nishiyama

(10) Patent No.: US 8,570,213 B2
(45) Date of Patent: Oct. 29, 2013

(54) METHOD AND DEVICE FOR REDUCING FAKE IMAGE, RADAR APPARATUS, AND FAKE IMAGE REDUCTION PROGRAM

(75) Inventor: Koji Nishiyama, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 332 days.

(21) Appl. No.: 12/941,733

(22) Filed: Nov. 8, 2010

(65) Prior Publication Data

US 2011/0169685 A1    Jul. 14, 2011

(30) Foreign Application Priority Data

Jan. 12, 2010    (JP) ................................. 2010-003519

(51) Int. Cl.
*G01S 13/00*    (2006.01)
(52) U.S. Cl.
USPC ............... 342/179; 342/91; 342/93; 342/159; 342/189
(58) Field of Classification Search
USPC ........... 342/27, 118, 146, 147, 159–164, 179, 342/189, 89–97
See application file for complete search history.

(56) References Cited

U.S. PATENT DOCUMENTS

| | | | | |
|---|---|---|---|---|
| 3,885,237 A | * | 5/1975 | Kirkpatrick | 342/26 B |
| 3,919,707 A | * | 11/1975 | Evans | 342/90 |
| 3,943,511 A | * | 3/1976 | Evans et al. | 342/94 |
| 4,005,415 A | * | 1/1977 | Kossiakoff et al. | 342/90 |
| 4,021,805 A | * | 5/1977 | Effinger et al. | 342/94 |
| 4,079,376 A | * | 3/1978 | Kirk, Jr. | 342/93 |
| 4,095,222 A | * | 6/1978 | Mooney, Jr. | 342/93 |
| 4,339,754 A | * | 7/1982 | Hammers et al. | 342/89 |
| 4,377,811 A | * | 3/1983 | Mooney et al. | 342/94 |
| 4,780,720 A | * | 10/1988 | Watts | 342/91 |
| 5,212,490 A | * | 5/1993 | Nelson et al. | 327/185 |
| 5,345,242 A | * | 9/1994 | Roberts et al. | 342/159 |
| 5,627,545 A | * | 5/1997 | Van Genderen et al. | 342/162 |
| 5,969,676 A | * | 10/1999 | Tran et al. | 342/442 |
| 6,087,977 A | * | 7/2000 | Rost | 342/93 |
| 6,127,965 A | * | 10/2000 | McDade et al. | 342/159 |
| 6,137,435 A | * | 10/2000 | Kai | 342/70 |
| 6,157,339 A | * | 12/2000 | Sato et al. | 342/70 |
| 6,323,802 B1 | * | 11/2001 | Tokoro | 342/70 |
| 6,441,775 B1 | * | 8/2002 | Fujikawa et al. | 342/185 |
| 6,452,665 B1 | * | 9/2002 | Kikuchi | 356/4.01 |
| 6,603,425 B1 | * | 8/2003 | Woodell | 342/26 R |
| 6,653,947 B2 | * | 11/2003 | Dwyer et al. | 340/970 |
| 6,683,559 B2 | * | 1/2004 | Matsui et al. | 342/159 |

(Continued)

FOREIGN PATENT DOCUMENTS

| | | |
|---|---|---|
| JP | 4-54478 A | 2/1992 |
| JP | 8-82671 A | 3/1996 |
| JP | 2004-170165 A | 6/2004 |

*Primary Examiner* — Jack W Keith
*Assistant Examiner* — Peter Bythrow
(74) *Attorney, Agent, or Firm* — Birch, Stewart, Kolasch & Birch, LLP

(57) ABSTRACT

This disclosure provides a fake image reduction device, which includes a target object detection module for being inputted with an echo signal from an antenna that transmits an electromagnetic wave and receives the echo signal, measuring a level of the echo signal to detect a target object, a reflecting body identifying module for identifying the detected target object as a reflecting body, and a fake image area setting module for setting a fake image area according to a distance and an azimuth direction from a transmitting position of the electromagnetic wave to the identified reflecting body.

14 Claims, 8 Drawing Sheets

(56) References Cited

U.S. PATENT DOCUMENTS

| | | | |
|---|---|---|---|
| 6,693,583 B2* | 2/2004 | Tamatsu et al. | 342/70 |
| 6,771,207 B1* | 8/2004 | Lang | 342/26 R |
| 6,812,886 B2* | 11/2004 | Garren | 342/179 |
| 6,850,186 B2* | 2/2005 | Hellsten | 342/93 |
| 6,898,528 B2* | 5/2005 | Zorka et al. | 701/301 |
| 7,006,032 B2* | 2/2006 | King et al. | 342/29 |
| 7,095,358 B2* | 8/2006 | Krikorian et al. | 342/25 B |
| 7,236,121 B2* | 6/2007 | Caber | 342/62 |
| 7,259,715 B1* | 8/2007 | Garren et al. | 342/179 |
| 7,327,285 B2* | 2/2008 | McCauley et al. | 340/963 |
| 7,362,259 B2* | 4/2008 | Gottwald | 342/70 |
| 7,417,579 B1* | 8/2008 | Woodell | 342/26 B |
| 7,471,234 B1* | 12/2008 | Lang | 342/26 R |
| 7,492,305 B1* | 2/2009 | Woodell et al. | 342/26 B |
| 7,586,436 B2* | 9/2009 | Wakayama et al. | 342/147 |
| 7,623,061 B2* | 11/2009 | Spyropulos et al. | 342/70 |
| 7,808,422 B1* | 10/2010 | Woodell et al. | 342/26 B |
| 7,928,896 B2* | 4/2011 | Jin et al. | 342/85 |
| 8,203,480 B1* | 6/2012 | Woodell et al. | 342/26 B |
| 2001/0054976 A1* | 12/2001 | Sauer | 342/70 |
| 2003/0103000 A1* | 6/2003 | Matsui et al. | 342/159 |
| 2003/0122703 A1* | 7/2003 | Kishida et al. | 342/70 |
| 2003/0179129 A1* | 9/2003 | Tamatsu et al. | 342/70 |
| 2004/0027276 A1* | 2/2004 | Herman | 342/181 |
| 2004/0078196 A1* | 4/2004 | Abe et al. | 704/221 |
| 2004/0130480 A1* | 7/2004 | Hellsten | 342/59 |
| 2005/0195104 A1* | 9/2005 | Liebscher et al. | 342/191 |
| 2006/0055590 A1* | 3/2006 | Moriya et al. | 342/118 |
| 2006/0082493 A1* | 4/2006 | Fujikawa et al. | 342/159 |
| 2006/0238405 A1* | 10/2006 | Wakayama et al. | 342/79 |
| 2006/0273946 A1* | 12/2006 | Krikorian et al. | 342/25 A |
| 2006/0284762 A1* | 12/2006 | Garren | 342/179 |
| 2007/0008210 A1* | 1/2007 | Kibayashi et al. | 342/70 |
| 2007/0165967 A1* | 7/2007 | Ando et al. | 382/291 |
| 2007/0264012 A1* | 11/2007 | Healey et al. | 398/13 |
| 2008/0030401 A1* | 2/2008 | Kojima et al. | 342/185 |
| 2008/0111730 A1* | 5/2008 | Ding et al. | 342/90 |
| 2008/0111731 A1* | 5/2008 | Hubbard et al. | 342/160 |
| 2008/0169974 A1* | 7/2008 | Fujikawa et al. | 342/179 |
| 2009/0315755 A1* | 12/2009 | Cornic et al. | 342/38 |
| 2010/0214153 A1* | 8/2010 | Kikuchi | 342/70 |

* cited by examiner

AVERAGING PROCESSING

BILINEAR INTERPOLATION PROCESSING

METHOD AND DEVICE FOR REDUCING FAKE IMAGE, RADAR APPARATUS, AND FAKE IMAGE REDUCTION PROGRAM

CROSS-REFERENCE TO RELATED APPLICATION(S)

The application claims priority under 35 U.S.C. §119 to Japanese Patent Application No. 2010-003519, which was filed on Jan. 12, 2010, the entire disclosure of which is hereby incorporated by reference.

TECHNICAL FIELD

The present invention relates to a method and device for processing an echo signal, and, more particularly to a method and device for reducing a fake image, as well as to a radar apparatus and a fake image reduction program.

BACKGROUND

Radar apparatuses discharge an electromagnetic wave from an antenna toward a specific direction or all directions, and receive an echo signal to detect a target object from a level of the echo signal. The target objects are rendered on displays. The radar apparatuses are applied to a wide range of fields, such as ships and airplanes.

However, the conventional radar apparatus, if applied to a ship radar, may detect a target object which does not originally exist when seen from a ship equipped with the radar apparatus (hereinafter, referred to as a "ship concerned"), as an echo signal from the target object, for example. A radar image caused by such a target object not originally existing is referred to as a "fake image." The fake image may be produced from side lobes of the electromagnetic wave discharged from the antenna. However, other types of fake images may be produced, which do not cause side lobes. For example, a fake image which is typically detected such that a second target object exists behind a first target object is known (see JP 2004-170165(A), JP H08-082671(A), and JP H04-054478(A)).

Because the fake image is unnecessary in the radar image, it is need to be removed. However, the conventional radar apparatus is not typically equipped with a function to appropriately identify such a fake image and reduce the fake image.

SUMMARY

Therefore, the present invention is made in view of the above situations and provides a method and device for reducing a fake image by image processing, as well as provides a radar apparatus and a fake image reduction program.

According to an aspect of the invention, a fake image reduction device is provided, which includes a target object detection module for being inputted with target object image data generated on the basis of an echo signal from an antenna that transmits an electromagnetic wave and receives the echo signal, measuring a level of the echo signal to detect the target objects, a reflecting body identifying module for identifying the detected target object as a reflecting body, and a fake image area setting module for setting a fake image area according to a distance and an azimuth direction from a transmitting position of the electromagnetic wave to the identified reflecting body.

According to the aspect of the invention, a fake image detected so that a second target object exists behind a first target object is to be reduced. Such a fake image is typically generated due to that an electromagnetic wave discharged is reflected to different directions from a ship equipped with the fake image reduction device (hereinafter, referred to as a "ship concerned") after being reflected on a target object (first target object), and then, reflected on another target object (second target object). After that, the twice-reflected wave is received by the ship concerned via the first target object. The fake image reduction device is constituted so that the fake image can be reduced appropriately based on the above-described principle.

The fake image reduction device may further include an echo level correction module for correcting the level of the echo signal located within the fake image area.

The reflecting body identifying module may identify a target object nearest to the transmitting position among target objects for each azimuth direction, as the reflecting body.

The reflecting body identifying module may calculate a correlation value between the echo signal corresponding to the target object and the echo signal at each position located on a circle centering on the target object nearest to the transmitting position, and when the correlation value is more than a predetermined threshold, may identify the target object nearest to the transmitting position as the reflecting body.

The fake image reduction device may further include a map data input module for inputting map data including positional information and altitude information on a stationary target object. The reflecting body identifying module may identify the target object as the reflecting body when the altitude information on the target object is more than a predetermined value at the position of the target object.

The fake image area setting module may be interposed between straight lines that connect each of at least two end points of the reflecting body and the transmitting position, respectively, and set an area that exists farther from the reflecting body with respect to the transmitting position as the fake image area.

The fake image area setting module may determine a correction amount to the level of the echo signal of each of the target objects existing within the fake image area, based on the level of the echo signal of each of the target objects existing within the fake image area, and the level of the echo signal located at a symmetrical position to the target object with respect to a symmetry axis that is a straight line connecting between two points on or inside of the boundary of the reflecting body.

The fake image area setting module may determine a correction amount to the level of the echo signal of each of the target objects existing within the fake image area, based on the level of the echo signal of each of the target objects existing within the fake image area, and the level of the echo signal located at a symmetrical position to the target object with respect to a symmetry axis that is a line formed by a straight line connecting between at least two points on or inside of the boundary of the reflecting body.

The fake image area setting module may determine a correction amount to the level of the echo signal of each of the target objects existing within the fake image area based on the level of the echo signal of each of the target objects existing within the fake image area and the level of the echo signal outside the fake image area, the echo signal being on a circle centering on a point located on or inside of the boundary of the reflecting body.

The reduction processing module may reduce the level of the echo signal located within the fake image area when the level of the echo signal located within the fake image area is higher than the level of the echo signal located at a symmetrical position.

The reduction processing module may reduce the level of the echo signal more as the level difference of both the echo signals becomes smaller.

The reduction processing module may reduce the level of the echo signal located within the fake image area when a level difference of both the echo signals is smaller than a predetermined value.

The fake image area setting module may carry out averaging processing or bilinear-interpolating processing for the boundary of the fake image area.

According to another aspect of the invention, a radar apparatus is provided, which includes an antenna for transmitting an electromagnetic wave and receiving an echo signal, a target object detection module for being inputted with the echo signal, measuring a level of the echo signal to detect a target object, a reflecting body identifying module for identifying the detected target object as a reflecting body, a fake image area setting module for setting a fake image area according to a distance and an azimuth direction from a transmitting position of the electromagnetic wave to the reflecting body identified based on an identifier, an echo level correction module for correcting the level of the echo signal located within the fake image area, and outputting the level-corrected echo signal, and an image display module for generating image data based on the echo signal including the level-corrected echo signal and displaying an image based on the image data.

According to the aspect of the invention, a fake image detected so that a second target object exists behind a first target object is to be reduced. Such a fake image is typically generated due to that an electromagnetic wave discharged is reflected to different directions from a ship after being reflected on a target object (first target object), and then, reflected on another target object (second target object). After that, the twice-reflected wave is received by the ship concerned via the first target object. The radar apparatus is constituted so that the fake image can be reduced appropriately based on the above-described principle.

According to another aspect of the invention, a method of reducing a fake image is provided, which includes inputting an echo signal from an antenna that transmits an electromagnetic wave and receives the echo signal, measuring a level of the echo signal to detect a target object, identifying the detected target object as a reflecting body, setting a fake image area according to a distance and an azimuth direction from a transmitting position of the electromagnetic wave to the identified reflecting body, and correcting the level of the echo signal located within the fake image area.

According to the aspect of the invention, a fake image detected so that a second target object exists behind a first target object is to be reduced. Such a fake image is typically generated due to that an electromagnetic wave discharged is reflected to different directions from a ship after being reflected on a target object (first target object), and then, reflected on another target object (second target object). After that, the twice-reflected wave is received by the ship concerned via the first target object. The method is configured so that the fake image can be reduced appropriately based on the above-described principle.

The identifying as the reflecting body may include identifying a target object nearest to the transmitting position as the reflecting body for each azimuth direction among the target objects.

The identifying as the reflecting body may include calculating a correlation value between the echo signal corresponding to the target object and the echo signal at each position located on a circle centering on the target object nearest to the transmitting position, and when the correlation value is more than a predetermined threshold, identifying the target object as the reflecting body.

The method may further include inputting map data including positional information and altitude information on a stationary object. The identifying as the reflecting body may include identifying the target object as the reflecting body when the altitude information included in the map data is more than a predetermined value at a position of the target object.

The correcting the level of the echo signal located within the fake image area may include determining the correction amount so that the level of the echo signal is reduced more as the level difference of both the echo signals becomes smaller, when the level of the echo signal located within the fake image area is higher than the level of the echo signal at a symmetrical position to a symmetry axis that is a straight line connecting end points of the reflecting body.

According to another aspect of the invention, a fake image reduction program is provided, which includes causing a computer to input an echo signal from an antenna that transmits an electromagnetic wave and receives the echo signal, and measure a level of the echo signal to detect a target object, causing a computer to identify the detected target object as a reflecting body, causing a computer to set a fake image area according to a distance and an azimuth direction from a transmitting position of the electromagnetic wave to the reflecting body identified based on an identifier and causing a computer to correct the level of the echo signal located within the fake image area.

According to the aspect of the invention, a fake image detected so that a second target object exists behind a first target object is to be reduced. Such a fake image is typically generated due to that an electromagnetic wave discharged is reflected to different directions from a ship after being reflected on a target object (first target object), and then, reflected on another target object (second target object). After that, the twice-reflected wave is received by the ship concerned via the first target object. The fake image reduction program is constituted so that the fake image can be reduced appropriately based on the above-described principle.

BRIEF DESCRIPTION OF THE DRAWINGS

The present disclosure is illustrated by way of example and not by way of limitation in the figures of the accompanying drawings, in which the like reference numerals indicate like elements and in which.

Figure 6A:
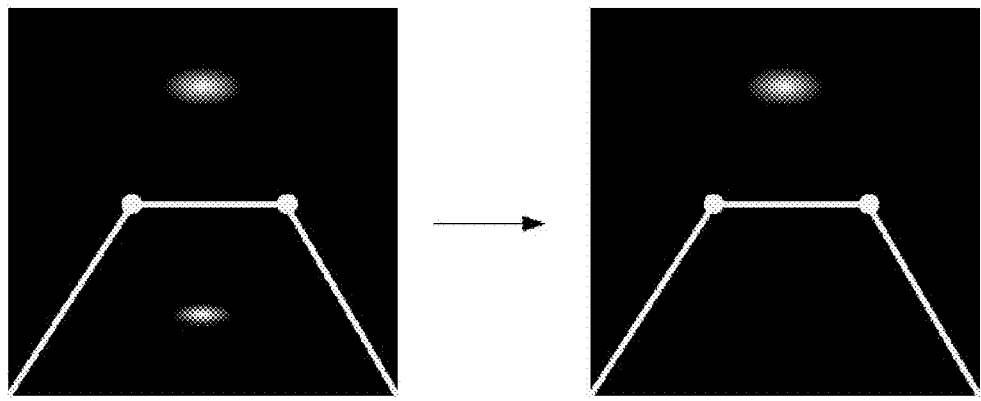
Figure 6B:
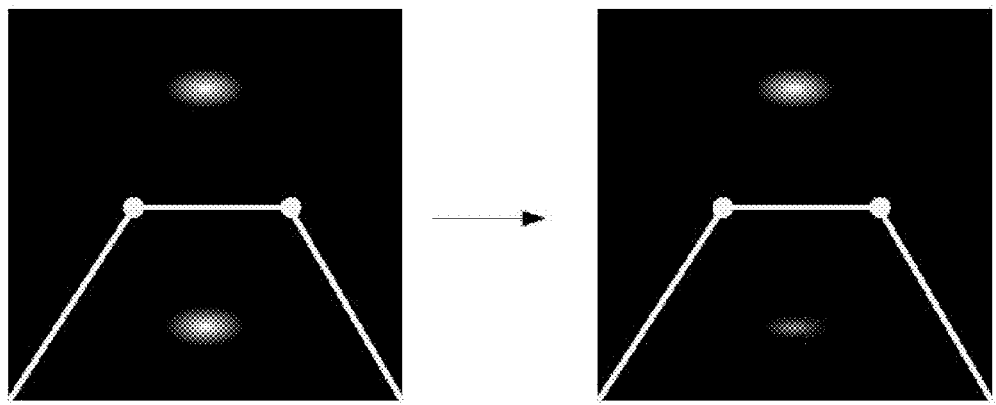
Figure 6C:
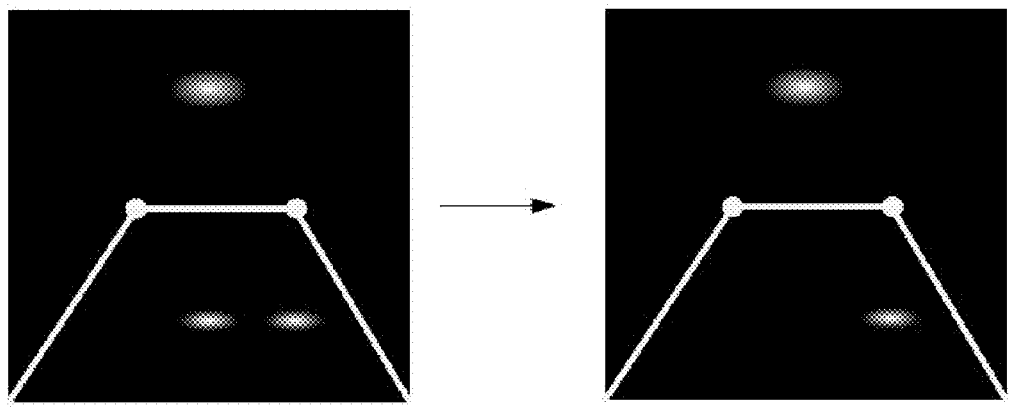
Figure 7A:
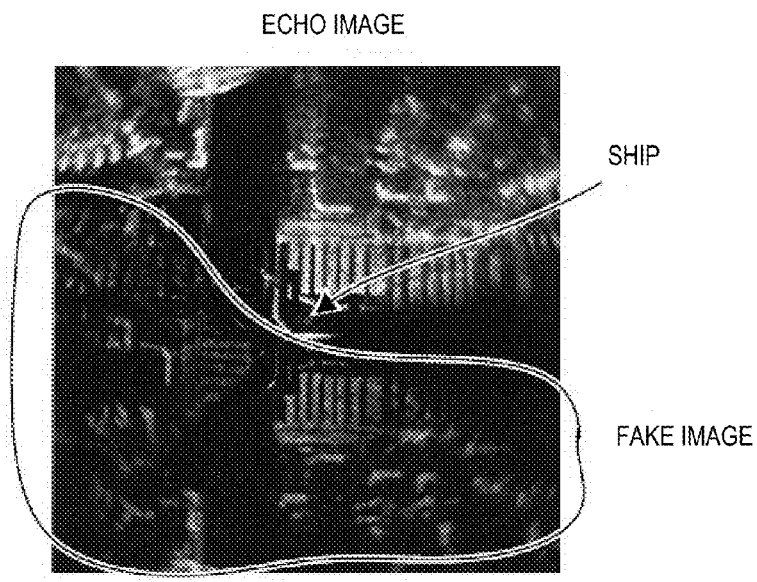
Figure 7B:
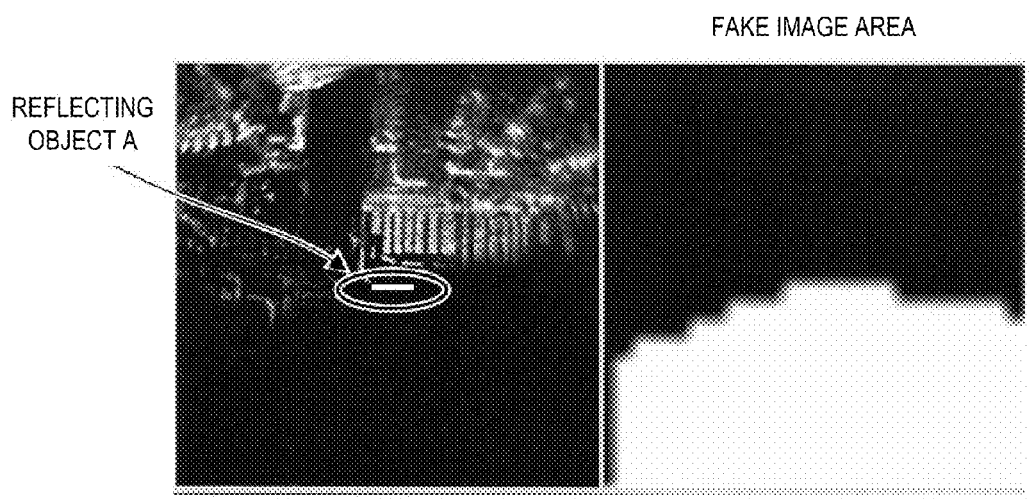
Figure 7C:
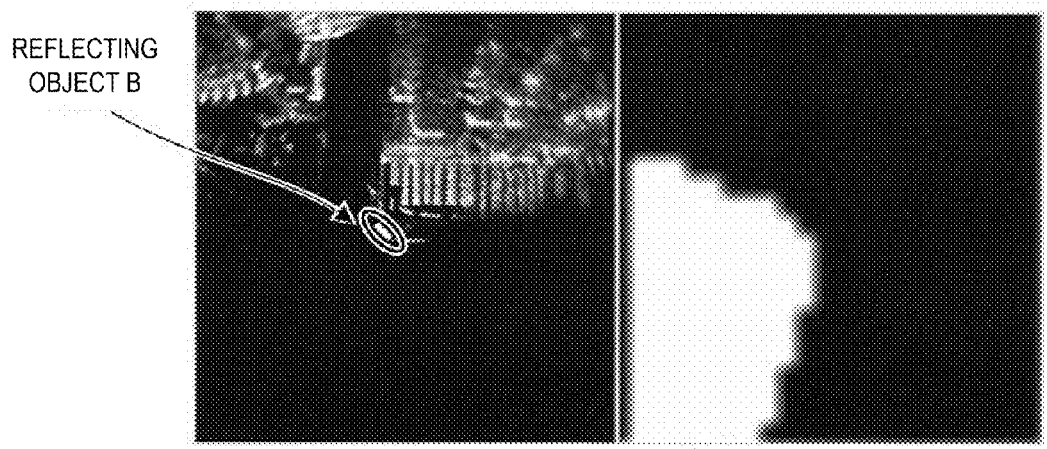
Figure 7D:
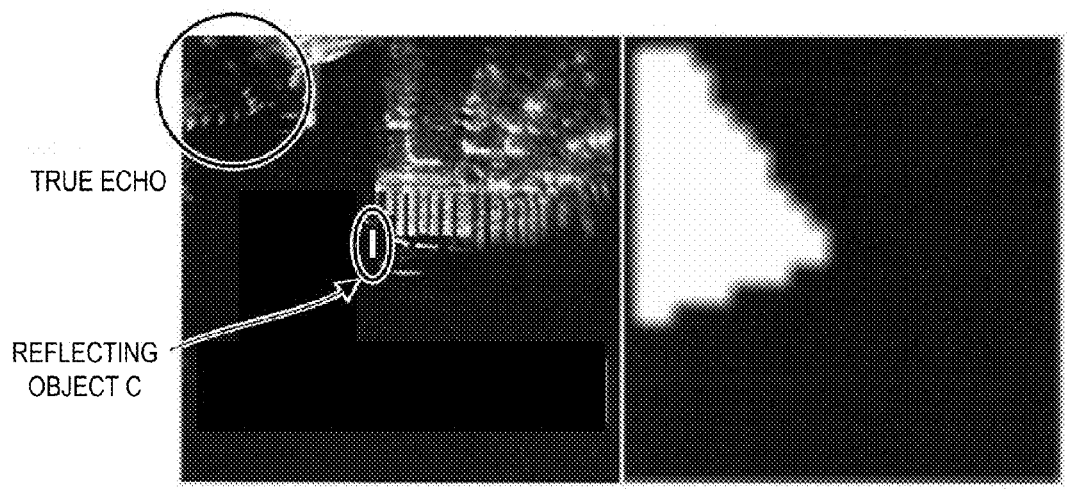

5B is a view showing post-process image data when bilinear interpolation processing is carried out for the boundary;

FIGS. 6A to 6C are views showing level-comparison processing and level-correction processing, where FIG. 6A shows a case when a level of the echo signal for which a fake image is detected is zero, FIG. 6B shows a case when the level of the echo signal for which the fake image is detected is reduced from an original level, FIG. 6C shows a case when the level of the echo signal for which the fake image is detected is selectively reduced down to zero;

FIG. 7A to 7D are views showing actual echo images, where FIG. 7A is a view showing a set fake image area, FIG. 7B is views where a reflecting body "A" is identified and a view from which an image of the fake image area is removed, FIG. 7C is views where a reflecting body B is identified and a view from which the image of the fake image area is removed, and FIG. 7D is views where a reflecting body C is identified and a true echo signal remains, and a view from which the image of the fake image area is removed.

DETAILED DESCRIPTION

Embodiments of a fake image reduction device, a radar apparatus, a method of reducing a fake image, and a fake image reduction program according to the present invention are described with reference to the appended drawings.

First Embodiment

Figure 1:
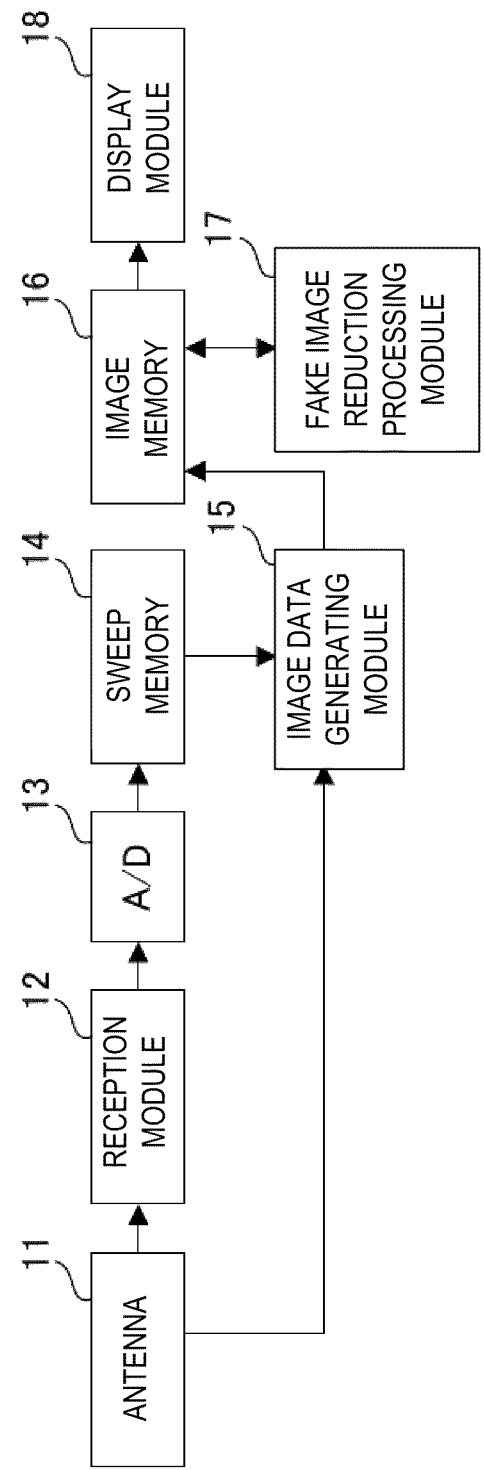
FIG. 1 is a block diagram showing a configuration of a radar apparatus where an image processing device according to an embodiment of the present invention is built therein.

FIG. 1 is a block diagram showing a configuration of a radar apparatus where an image processing device according to an embodiment of the present invention is built therein. The radar apparatus is installed in a ship (ship concerned), and transmits and receives electromagnetic waves around the ship concerned to detect target objects, such as other ships, for example.

In FIG. 1, the radar apparatus includes an antenna 11, a reception module 12, an A/D conversion module 13, a sweep memory 14, an image data generating module 15, an image memory 16, a fake image reduction processing module 17, and a display module 18.

The antenna 11 transmits an electromagnetic wave to each azimuth direction around the ship concerned, and receives an echo signal, respectively. The reception module 12 outputs a value corresponding to a level of the echo signal received by the antenna 11 (echo level) to the A/D conversion module 13. The A/D conversion module 13 carries out a digital conversion of the inputted analog echo signal value, and outputs it to the sweep memory 14 as measurement data.

The sweep memory 14 stores the measurement data for one measurement cycle (for 360 degrees around the ship concerned). Each measurement data is associated with coordinates of a polar coordinate system (an azimuth direction and a distance), and is stored as sweep data. In order for the antenna 11 to transmit and receive the electromagnetic wave in a pulse shape at every predetermined angle (azimuth direction), the sweep data is stored as a discrete value of every predetermined sample for each transceiving angle of the antenna 11.

The image data generating module 15 converts the sweep data of each sample of the polar coordinate system stored in the sweep memory 14 into data on a rectangular coordinate system where a position of the ship concerned is set to an origin, and then outputs it as a pixel intensity value of tone according to the echo level of each sample. The pixel intensity value at respective coordinates of the rectangular coordinate system is stored in the image memory 16 as image data.

The display module 18 displays the image data stored in the image memory 16 as a radar image or echo image for a user (see FIGS. 6A to 6C). In this embodiment, an example where a background is black and pixels with higher pixel intensity values are displayed brighter in white. Conversely, the background may be white and the pixel with higher pixel intensity values are displayed darker in black. Alternatively, they may be displayed as a color image.

The fake image reduction processing module 17 is inputted with the image data from the image memory 16, and performs processing for reducing a fake image of the echo image. Hereinafter, the processing of the fake image reduction processing module 17 is described in detail.

Figure 2A:
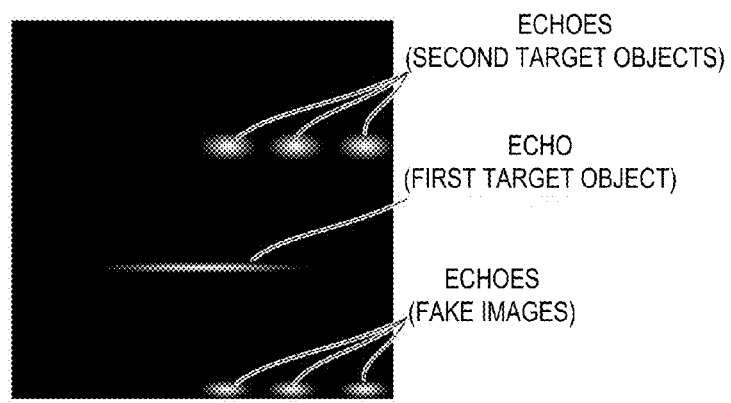
FIG. 2A is a display example of image data before fake image reduction processing is performed.

FIG. 2A is a schematic diagram when displaying on the display module 18 the image data before performing the fake image reduction processing. The center position in this image corresponds to the position of the ship concerned (transmitting position of the electromagnetic waves in the radar apparatus); however it is not illustrated particularly. This image is oriented so that the top direction corresponds to north.

As shown in FIG. 2A, the electromagnetic wave discharged from the antenna 11 is reflected on a target object, which is located south from the ship concerned (first target object), and reflected in different directions from the ship concerned direction, and then reflected on three other target objects, which are located northeast from the ship concerned (second target objects), and they are received by the antenna 11 as echo signals via the first target object. Therefore, fake images (three echoes) are detected as if the second target objects exist southeast from the first target object.

For this reason, the fake image reduction device of this embodiment sets an area where a fake image is possibly generated (fake image area). In this embodiment, the fake image area is set as an area that is interposed between straight lines connecting each of at least two end points of the reflecting body and the transmitting position of the electromagnetic wave (antenna position), and that exists farther from the reflecting body with respect to the antenna.

With reference to the above drawings, setting of the fake image area is described in detail.

The fake image reduction processing module 17 sets a predetermined reflecting body for each target object having a high echo level which can be determined to be a target object (echo level more than a predetermined threshold). For example, a target object that is nearest to the ship concerned and has an echo level more than the predetermined threshold is determined to be a reflecting body (mirror body). That is, in FIG. 2A, the first target object, which is located south from the ship concerned (downward from the center in this figure), is determined to be a reflecting body. The reflecting body is set so as to be approximated as a straight line as follows.

The fake image reduction device of this embodiment determines whether the echo signal located within the fake image area is a fake image. In order to perform this, a symmetry axis is set to determine whether the echo signal is reflected on the reflecting body or reflected on an original and true target object.

The fake image area setting module 17 determines a correction amount to the level of the echo signal of each of the target objects which is located within the fake image area based on the level of the echo signal of each of the target objects located within the fake image area, and the level of the echo signal located at a symmetrical position to the target object with respect to a symmetry axis that is a straight line connecting between two points on or inside of the boundary of the reflecting body. Alternatively, the correction amount to the level of the echo signal of each of the target objects located within the fake image area may be determined based on the level of the echo signal of each of the target objects located within the fake image area, and the level of the echo signal located at a symmetrical position to the target object with respect to a symmetry axis that is a line formed by a straight line connecting between at least two points located on or inside of the boundary of the reflecting body.

Figure 2B:
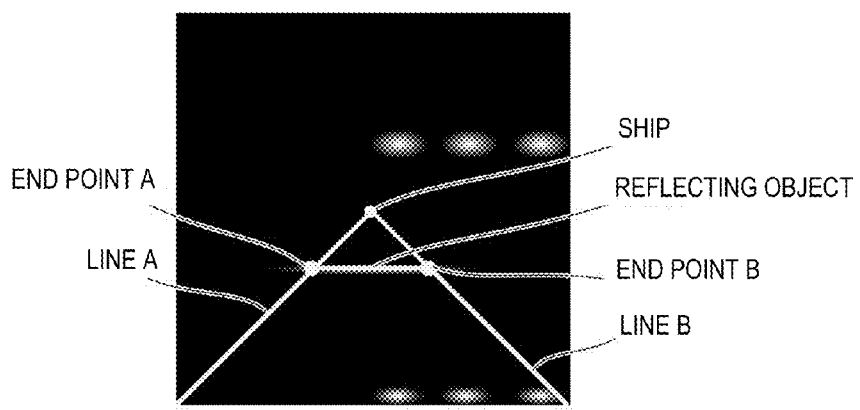
FIG. 2B is a view showing setting of a fake image area.
Figure 2C:
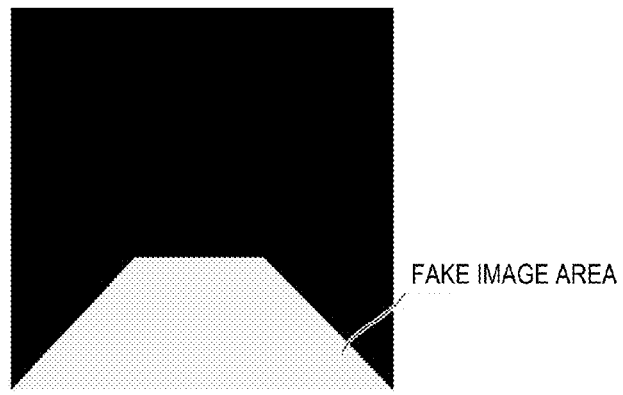
FIG. 2C is a view showing a masked fake image area.

Setting of the above symmetry axis is described in detail with reference to FIGS. 3A to 3C and FIGS. 4A to 4C, in addition to FIGS. 2B and 2C.

Figure 3A:
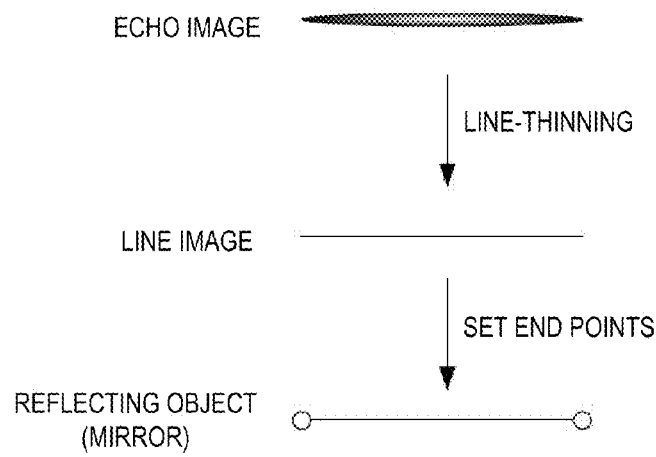
FIG. 3A is a view showing a setting method of a reflecting body when the reflecting body can be approximated by a straight line.

As shown in FIG. 3A, the fake image reduction processing module 17 carries out line-thinning of the echo image of the target object to convert it into a line image. Various techniques for the line-thinning may be adopted. For example, binarizing may be performed sequentially from the circumference of the image so that a line which finally remains is located at the center position of the original image, to narrow down a width of the image. Hereinafter, this technique is particularly described as an example.

Then, the fake image reduction processing module 17 extracts two end points of the line image obtained as described above, and sets the reflecting body as a vector represented by coordinates of these two points.

Figure 3B:
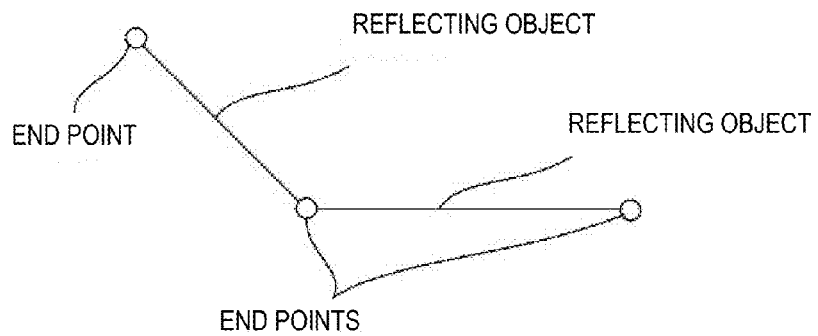
FIG. 3B is a view showing a setting method of a reflecting body when the reflecting body can be approximated by two or more straight lines.
Figure 3C:
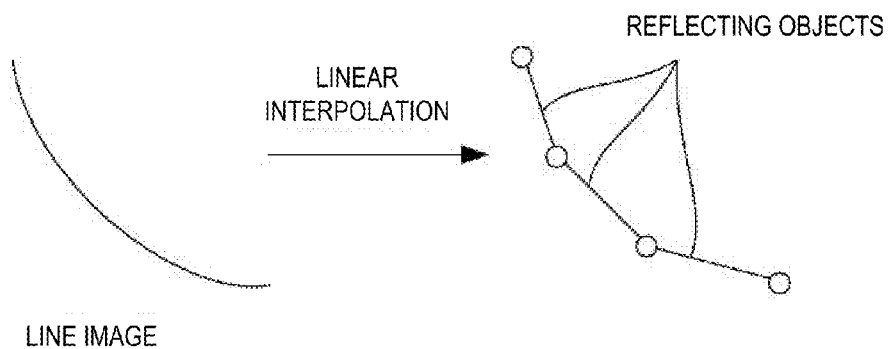
FIG. 3C is a view showing a setting method of a reflecting body when the reflecting body can be approximated by a curve.

As shown in FIG. 3B, if the line-thinned image may be formed with two or more straight lines, the end points may be set for each of the straight lines to set two or more reflecting bodies. Alternatively, if the line-thinned image is a curve, as shown in FIG. 3C, a linear interpolation (broken line approximation) may be performed.

The fake image reduction processing module 17 sets the fake image area according to the distance and the angle from the position of the ship concerned (transmitting position of the electromagnetic waves) to the set reflecting body. As shown in FIG. 2B, the fake image reduction processing module 17 sets the straight lines (lines A and B) that connect the position of the ship concerned (transmitting position of the electromagnetic waves) and the end points (end points A and B). Then, as shown in FIG. 2C, an area surrounded by the straight line of the reflecting body, the line A, and the line B are determined to be the fake image area.

The reflecting body is not to be limited to the target object nearest to the ship concerned as described above. For example, map data that contains, for example, each stationary object (such as altitude information (above sea level) of a building) may be inputted in advance. Then, an echo in which an echo level is more than the inputted predetermined threshold and the altitude information included in the map data at the position where the echo is detected is more than a predetermined value may also be determined to be the reflecting body. In this case, because the shape of the target object can be accurately derived based on the map data, the straight line of the forefront edge of the building nearest to the ship concerned can be set as the reflecting body.

Alternatively, all other ships and the like which does not exist in the map data and exhibit higher echo levels may be set as the reflecting bodies.

Figure 4A:
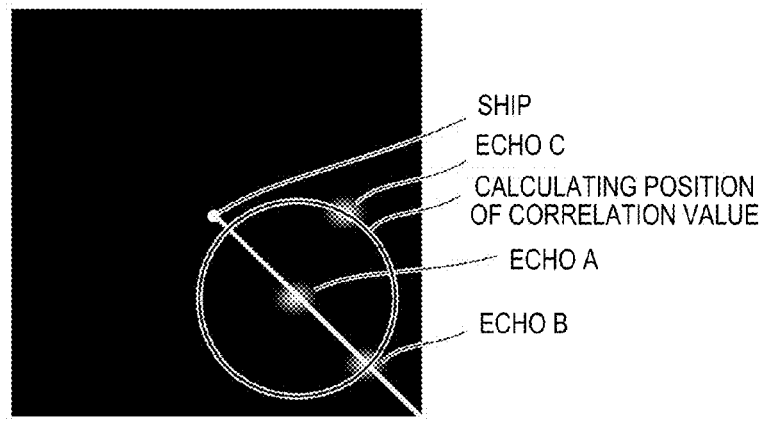
FIGS. 4A to 4C are views showing a setting method of a reflecting body, and fake image detection, respectively.

Alternatively, as shown in FIG. 4A, for the echo signal corresponding to each of the target objects, a correlation value with each position located on a circle centering on the target object with the high possibility of being the reflecting body may be calculated. That is, when two or more target objects (echoes A and B) are detected in a certain azimuth direction, it is highly possible that the nearest echo A is the reflecting body, and the echo B farther than the echo A is a fake image. For this reason, a correlation value between each position located on the circle centering on the echo A which is nearest to the ship concerned and the echo B is calculated. For example, a correlation coefficient of a certain section for the echo level in each azimuth direction where the echo A is an origin is calculated. The certain section may be a section where the echo level which is more than the predetermined threshold is detected for the azimuth direction where the echo B is detected, for example.

If the target object nearest to the ship concerned (echo A) is the reflecting body and a true echo and a fake image are present on the circle centering on the target object, a position where the correlation value is high exists. Therefore, when the position which shows the correlation value more than the predetermined threshold exists, the fake image reduction processing module 17 sets the echo A as the reflecting body, the echo B as the fake image, the echo C as the true echo, and as shown in FIG. 2B, sets the fake image area by thinning the line of the target object (echo A).

Figure 4B:
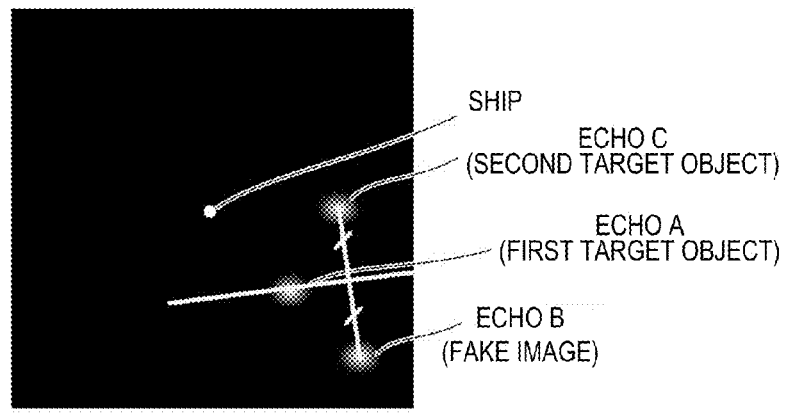

As shown in FIG. 4B, the symmetry axis may be set at a position which is equally distant from the echo B and the echo C. Then, as shown in FIG. 4C, on the straight line which pass through the symmetry axis, the end points A and B may be set at a position included in the echo A (position having the echo level more than the predetermined threshold), and the straight line of the reflecting body may be set.

Figure 4C:
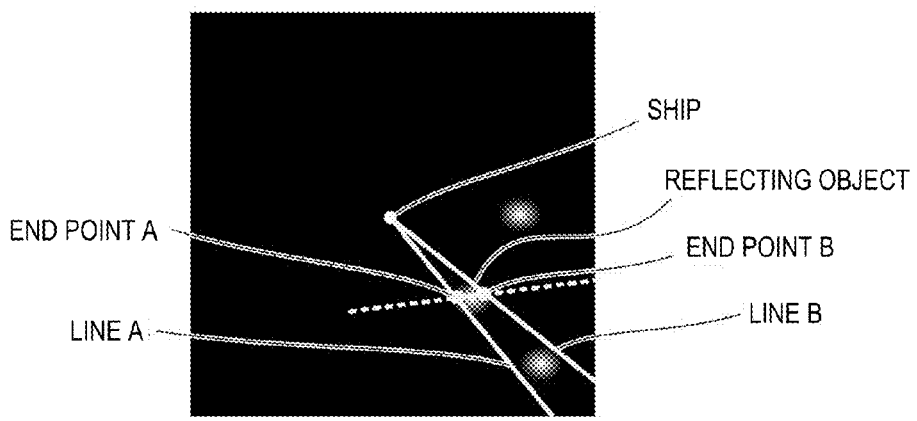

The techniques shown in FIGS. 4A to 4C are preferred when the reflecting body is a ship other than the ship concerned. In particular, also when the shape of the echo is close to a perfect circle, the reflecting body can be approximated to the straight line.

Figure 5A:
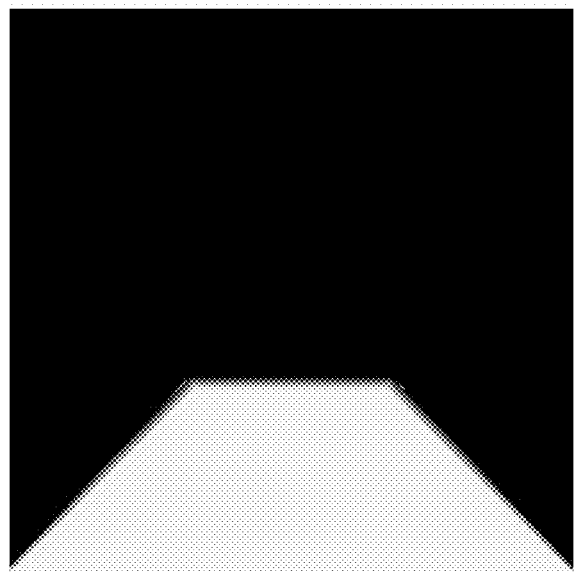
FIG. 5A is a view showing post-process image data when averaging processing is carried out for a boundary, and FIG.
Figure 5B:

Next, the fake image reduction processing module 17 performs processing that obscures the boundary of the fake image area. This obscure processing is performed in order to prevent that the boundary by the fake image reduction processing is emphasized to cause visual uncomfortableness. For example, it is implemented by performing circumference averaging processing (convolution operation) with a FIR filter, as shown in FIG. 5A. However, because the image processing with the FIR filter is high in load, bilinear interpolation (processing that performs the obscure processing after reducing the image in size, and expands the image afterward) as shown in FIG. 5B may be performed.

After performing the above processing, the fake image reduction processing module 17 performs processing for reducing the echo level located within the fake image area (lowering the intensity value of the fake image) to reduce the fake image. Then, the image data in the image memory 16 is updated to the image data after the fake image reduction, and it is displayed on the display module 18.

The echo level reduction processing may be processing for setting all the pixel intensity values within the area to 0; however, alternatively, weighted reduction processing according to the pixel intensity value as shown in FIGS. 6A to 6C may be performed. That is, each pixel intensity value Fake Lv within the fake image area is compared with a pixel intensity value Real Lv at the position symmetrical thereto with respect to the reflecting body as an axis, and a pixel intensity value Cancelled Lv after the reduction is determined as follows.

$$FakeLv >= RealLv \quad FakeLv \times \frac{FakeLv - RealLv}{MaxLv}$$
$$FakeLv < RealLv \quad 0$$

That is, as shown in FIG. 6A, if the pixel intensity value Fake Lv within the fake image area is lower than the pixel intensity value Real Lv at the symmetrical position, it is highly possible that the echo within the fake image area is the fake image. Using this principle, the processing that sets the pixel intensity value to 0 and erases the echo image is performed.

On the other hand, if the pixel intensity value Fake Lv within the fake image area is higher than the pixel intensity value Real Lv at the symmetrical position, an amount of the reduction is increased more as a difference between the pixel intensity value Fake Lv within the fake image area and the pixel intensity value Real Lv at the symmetrical position becomes smaller. That is, as shown in FIG. 6B, if the difference between the pixel intensity value Fake Lv within the fake image area and the pixel intensity value Real Lv at the symmetrical position is small, it is highly possible that the pixel intensity value Fake Lv is accidentally high due to setting errors of the reflecting body, transceiving fluctuation of the electromagnetic wave, etc. Therefore, the pixel intensity value is lowered greatly.

On the other hand, as shown in FIG. 6C, if the difference between the pixel intensity value Fake Lv within the fake image area and the pixel intensity value Real Lv at the symmetrical position is large, the pixel intensity value is not so lowered because it is highly possible that the echo within the fake image area is a true echo, or the pixel intensity value may be outputted as it is. Thereby, the true echo existing within the fake image area can be left to some extent.

For each pixel intensity value within the fake image area, the comparison may be performed including circumference pixels of the position of the symmetry axis that is set as the reflecting body. For example, the comparison may be performed with the pixel intensity value of the highest level among the circumference pixels, or an average value of the circumference pixels may be calculated and the comparison may be performed with the average value.

An actual echo image is described with reference to FIGS. 7A to 7D.

FIG. 7A is a view showing the actual echo image before performing the fake image reduction processing. In this example, the reflecting bodies exist in a south direction, a southwest direction, and a west direction around the ship concerned, and a number of fake images to the true echo located to north from the ship concerned are displayed behind the respective reflecting bodies. As described above, the fake image reduction processing module 17 sets the reflecting bodies, and performs the fake image reduction processing. That is, as shown in FIG. 7B, a reflecting body A is set to south from the ship concerned and the fake image area is set, and the pixel intensity value FakeLv within the fake image area (right column) is compared with the pixel intensity value RealLv at the symmetrical position to perform the reduction processing. Because the true echo does not exist behind the reflecting body A located to south from the ship concerned, all the echoes are erased; thereby the fake image is eliminated.

Similarly, as shown in FIG. 7C, a reflecting body B is set to southwest from the ship concerned and the fake image area is set, and the pixel intensity value FakeLv within the fake image area (right column) is compared with the pixel intensity value RealLv at the symmetrical position to perform the reduction processing. Because the true echo does not exist behind the reflecting body B located to southwest from the ship concerned, all the echoes are erased, thereby the fake image is eliminated.

Further, as shown in FIG. 7D, a reflecting body C is set to west from the ship concerned and the fake image area is set, and the pixel intensity value FakeLv within the fake image area (right column) is compared with the pixel intensity value RealLv at the symmetrical position to perform the reduction processing. Behind the reflecting body C located to west from the ship concerned, a part where the pixel intensity value FakeLv is higher than the pixel intensity value RealLv at the symmetrical position exists. Because a certain amount of the echo remains, a true echo can be left to some extent.

As described above, the fake image reduction processing by the radar apparatus of this embodiment does not have to determine for all the target objects whether it is a fake image; however, the image processing can reduce the fake images existing in a certain area, in a lump. By performing the reduction processing comparing with the echo level at the symmetrical position to the reflecting body, the true echo can also be left to some extent.

Although the radar apparatus of this embodiment shows the example in which the image data is displayed on the display module 18, each target object may be acquired and tracked in addition to the display of the image data (use as a collision prevention assisting device). The fake image reduction processing of this embodiment can prevent the fake image from being acquired and tracked, and is very suitable also as the collision prevention assisting device.

In the foregoing specification, specific embodiments of the present invention have been described. However, one of ordinary skill in the technique appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a" "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A fake image reduction device, comprising:
a target object detector that
receives, as input, target object image data generated on the basis of an echo signal from an antenna that transmits an electromagnetic wave and receives the echo signal, and
measures a level of the echo signal to detect the target objects;
a reflecting body identifier that identifies the detected target object as a reflecting body by
calculating a correlation value between the echo signal corresponding to the target object and the echo signal at each position located on a circle centering on the target object nearest to the transmitting position, and
identifying the target object nearest to the transmitting position as the reflecting body in response to a determination that the calculated correlation value exceeds a predetermined threshold;
a fake image area setting module that sets a fake image area according to a distance and an azimuth direction from a transmitting position of the electromagnetic wave to the identified reflecting body; and
an echo level corrector that corrects the level of the echo signal located within the fake image area.

2. The fake image reduction device of claim 1, wherein the reflecting body identifier identifies a target object nearest to the transmitting position among target objects for each azimuth direction, as the reflecting body.

3. The fake image reduction device of claim 1, the fake image area setting module is configured to set a fake image area interposed between straight lines that connect each of at least two end points of the reflecting body and the transmitting position, respectively, such that the fake image area is set farther from the reflecting body with respect to the transmitting position and such that an echo signal at a position located on or within the circle centering on the target object nearest to the transmitting position is included within the fake image area.

4. The fake image reduction device of claim 3, further comprising a reduction processor,
the reduction processor being configured to determine a correction amount to the level of the echo signal of each of the target objects existing within the fake image area, based on the level of the echo signal of each of the target objects existing within the fake image area, and the level of the echo signal located at a symmetrical position to the target object with respect to a symmetry axis that is a straight line connecting between two points on or inside of the boundary of the reflecting body.

5. The fake image reduction device of claim 3, further comprising a reduction processor,
the reduction processor being configured to determine a correction amount to the level of the echo signal of each of the target objects existing within the fake image area, based on the level of the echo signal of each of the target objects existing within the fake image area, and the level of the echo signal located at a symmetrical position to the target object with respect to a symmetry axis that is a line formed by a straight line connecting between at least two points on or inside of the boundary of the reflecting body.

6. The fake image reduction device of claim 3, further comprising a reduction processor,
the reduction processor being configured to reduce the level of the echo signal located within the fake image area when the level of the echo signal located within the fake image area is higher than the level of the echo signal located at a symmetrical position.

7. The fake image reduction device of claim 6, wherein the reduction processor reduces the level of the echo signal located within the fake image area more as the level difference of both the echo signals becomes smaller.

8. The fake image reduction device of claim 3, further comprising a reduction processor,
the reduction processor being configured to reduce the level of the echo signal located within the fake image area when a level difference of both the echo signals is smaller than a predetermined value.

9. The fake image reduction device of claim 4, the fake image area setting module being configured to carry out averaging processing or bilinear-interpolating processing for the boundary of the fake image area.

10. The fake image reduction device of claim 1, further comprising:
an antenna that is configured to transmit an electromagnetic wave and receiving an echo signal;
an image data generator configured to generate target object image data on the basis on the echo signal; and
an image display module configured to generate image data based on the echo signal including the level-corrected echo signal and to display an image based on the image data.

11. A method of reducing a fake image, comprising:
inputting an echo signal from an antenna that transmits an electromagnetic wave and receives the echo signal, measuring a level of the echo signal to detect a target object;
identifying the detected target object as a reflecting body by
calculating a correlation value between the echo signal corresponding to the target object and the echo signal at each position located on a circle centering on the target object nearest to the transmitting position, and
identifying the target object nearest to the transmitting position as the reflecting body in response to the calculated correlation value being more than a predetermined threshold;
setting a fake image area according to a distance and an azimuth direction from a transmitting position of the electromagnetic wave to the identified reflecting body; and
correcting, with a processor, the level of the echo signal located within the fake image area by determining a correction amount to the level of the echo signal of each target object existing within the fake image area based on
the level of the echo signal of each of the target objects existing within the fake image area and
the level of the echo signal outside the fake image area, the echo signal outside the fake image area being on a circle centering on a point located on or inside of the boundary of the reflecting body.

12. The method of claim 11, wherein the identifying as the reflecting body includes identifying a target object nearest to the transmitting position as the reflecting body for each azimuth direction among the target objects.

13. A fake image reduction device, comprising:
a target object detector that receives, as input, target object image data generated on the basis of an echo signal from an antenna that transmits an electromagnetic wave and receives the echo signal, and measures a level of the echo signal to detect the target objects;
a reflecting body identifier that identifies the detected target object as a reflecting body by calculating a correlation value between the echo signal corresponding to the target object and the echo signal at each position located on a circle centering on the target object nearest to the transmitting position, and identifying the target object nearest to the transmitting position as the reflecting body in response to the calculated correlation value being more than a predetermined threshold;

a fake image area setting module that sets a fake image area according to a distance and an azimuth direction from a transmitting position of the electromagnetic wave to the identified reflecting body such that the fake image area is interposed between straight lines that connect each of at least two end points of the reflecting body and the transmitting position, respectively, and the fake image area is located farther away than the reflecting body with respect to the transmitting position, and at least one echo signal at a position located within the circle centering on the target object nearest the transmitting position is included in the fake image area;

an echo level corrector that corrects the level of the echo signal located within the fake image area.

14. The fake image reduction device of claim 13, further comprising a reduction processor that determines a correction amount to the level of the echo signal of each of the target objects existing within the fake image area based on the level of the echo signal of each of the target objects existing within the fake image area and the level of the echo signal outside the fake image area, the echo signal outside the fake image area being on a circle centering on a point located on or inside of the boundary of the reflecting body.

* * * * *